United States Patent
Scherabon

(10) Patent No.: US 8,212,678 B2
(45) Date of Patent: Jul. 3, 2012

(54) RFID SYSTEM, GATE ARRANGEMENT WITH RFID SYSTEM AND METHOD OF DETECTING TRANSPONDERS

(75) Inventor: Christian Scherabon, Graz (AT)

(73) Assignee: NXP B.V., Eindhoven (NL)

( * ) Notice: Subject to any disclaimer, the term of this patent is extended or adjusted under 35 U.S.C. 154(b) by 855 days.

(21) Appl. No.: 11/815,766

(22) PCT Filed: Feb. 1, 2006

(86) PCT No.: PCT/IB2006/050340
§ 371 (c)(1),
(2), (4) Date: Aug. 7, 2007

(87) PCT Pub. No.: WO2006/082560
PCT Pub. Date: Aug. 10, 2006

(65) Prior Publication Data
US 2008/0252420 A1    Oct. 16, 2008

(30) Foreign Application Priority Data
Feb. 7, 2005   (EP) .................................... 05100833

(51) Int. Cl.
*G01S 13/75* (2006.01)
*G08B 13/00* (2006.01)

(52) U.S. Cl. .................. 340/572.7; 340/10.2; 340/10.1; 340/572.4

(58) Field of Classification Search ...... 340/10.1–10.52, 340/572.1, 572.4, 572.7
See application file for complete search history.

(56) References Cited

U.S. PATENT DOCUMENTS

| | | | |
|---|---|---|---|
| 4,308,530 A * | 12/1981 | Kip et al. | 340/572.2 |
| 5,661,286 A | 8/1997 | Fujioka | |
| 5,686,902 A * | 11/1997 | Reis et al. | 340/10.2 |
| 6,064,320 A * | 5/2000 | d'Hont et al. | 340/933 |
| 6,750,771 B1 * | 6/2004 | Brand | 340/572.7 |

(Continued)

FOREIGN PATENT DOCUMENTS
JP    8138006 A    5/1996
(Continued)

OTHER PUBLICATIONS

Electromagnetic Compatibility and Radio Spectrum Matters (ERM); Short Range Devices; Road Transport and Traffic Telematics (RTTT); Short Range Radar Equipment Operating in the 24GHz Range; Part 1: Technical Requirements and Methods of Measurement; ETSI EN 302 288-1 ETSI Standards, European Telecommunications Standards Institute, Sophia-Antipo, FR, vol. ERM-TG31B, No. V111 Jan. 2005.

*Primary Examiner* — George Bugg
*Assistant Examiner* — Anne Lai

(57) ABSTRACT

With an RFID system for communicating between reading units (R1, R2) and transponders (T1, T2) in at least two different scan areas (S1, S2), wherein at least one reading unit (R1, R2) and at least one antenna (A1-A4, B1-B4) communicating with the reading unit are allocated to each scan area (S1, S2) for the radiation of electromagnetic signals (EA1-EA4, EB1-EB4) in the scan area (S1, S2), the antennas (A1-A4, B1-B4) are designed in such a way that at least one antenna (A1, A3) of a scan area (S1) has a different polarization and/or a different polarization rotation direction relative to at least one antenna (B2, B4) of another scan area (S2).

18 Claims, 1 Drawing Sheet

U.S. PATENT DOCUMENTS

| | | | |
|---|---|---|---|
| 6,836,216 B2 * | 12/2004 | Manov et al. | 340/572.7 |
| 6,946,950 B1 * | 9/2005 | Ueno et al. | 340/10.1 |
| 7,417,440 B2 * | 8/2008 | Peschmann et al. | 324/637 |
| 2003/0001739 A1 * | 1/2003 | Clucas et al. | 340/572.1 |
| 2003/0083964 A1 | 5/2003 | Horwitz et al. | |
| 2005/0156806 A1 * | 7/2005 | Ohta et al. | 343/834 |

FOREIGN PATENT DOCUMENTS

| | | |
|---|---|---|
| JP | 11248837 A | 9/1999 |
| JP | 2001273530 A | 10/2001 |
| JP | 2006113869 A | 4/2006 |

* cited by examiner

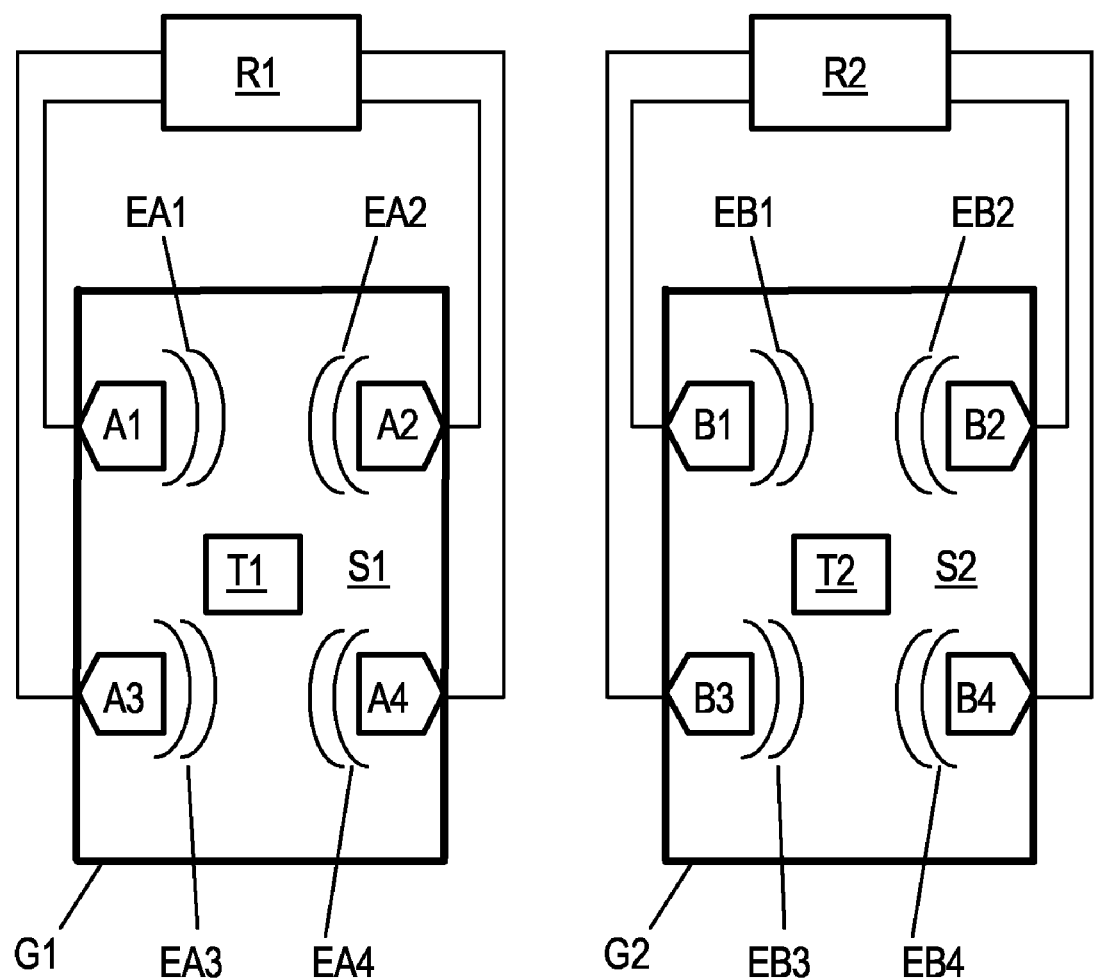

RFID SYSTEM, GATE ARRANGEMENT WITH RFID SYSTEM AND METHOD OF DETECTING TRANSPONDERS

FIELD OF THE INVENTION

The invention relates to an RFID system for communicating between reading units and transponders in at least two different scan areas, wherein at least one reading unit and at least one antenna communicating with the reading unit are allocated to each scan area for the radiation of electromagnetic signals to the scan area.

The invention further relates to a gate arrangement with at least two gates, wherein each gate has a scan area through which goods etcetera provided with transponders can be moved.

The invention further relates to a method of detecting transponders in at least two different scan areas, wherein at least one reading unit communicating with the transponders and at least one antenna communicating with the reading unit are allocated to each scan area for the radiation of electromagnetic signals to the scan area.

BACKGROUND OF THE INVENTION

As the previous European standards for the use of UHF ISM-frequency band (ISM=Industrial-Scientific-Medical) for RFID (radio frequency identification) applications did not fulfill the requirements of modern systems any more, meanwhile, by order of the European Commission, a proposal for a new standard has been defined, which is published under number EN 302 208 and the title "Electromagnetic compatibility and Radio spectrum Matters (ERM); Radio Frequency Identification Equipment operating in the 865 MHz to 868 MHz band with power levels up to 2 W"; this document can be downloaded from the web page http://www.etsi.org on the Internet. This new UHF standard EN 302 208 will be harmonized in Europe by mid 2006. In comparison with the previous regulation the essential advantage of this new regulation is a higher permitted transmitting power of 2 W ERP (=Effective Radiated Power) of the reading units in comparison with 0.5 W ERP today. Thus, for the first time in Europe UHF RFID Long Range Systems having a 4 to 6 m range and a large number of transponders is possible, against which previously only systems with ranges of maximum 2.5 m and few transponders could be implemented. Furthermore, the previous restriction of the duration of connection per cycle duration at maximum ten percent (10%) ceases to apply. The new standard also offers 10 channels with 200 kHz bandwidth each, as against a total bandwidth of 250 kHz today.

However, the new regulation also entails problems. For example, the new regulation demands an operating method of the reading units, which is called "Listen Before Talk" (LBT), in order to confront the danger of disturbances of other users in the ISM band, due to the higher permissible transmitting power of the reading units. Listen before talk is understood to mean that each reading unit that would like to communicate with a transponder by transmitting a modulated electromagnetic field should first check whether the channel intended to be used is free, that is, is not already being used by another reading unit in the vicinity. Precisely this means that a reading unit in the listen mode may not receive a signal with a power above −96 dBm. This limit is very stringent and hard to comply with and may lead to considerable restrictions in what is called a dense reader environment. An example of such a dense reader environment is what is called a Dock-Door application, in which at least two delivery gates are directly next to each other, as is usual in logistic applications. Then, trucks are directly unloaded via these typically 3 m broad delivery gates, wherein the goods provided with RFID transponders are scanned by an RFID reading unit during their moving through a respective delivery gate. These delivery gates, which are often arranged only at a distance of 10 cm next to each other, mostly have a respective reading unit and several antennas connected to the reading unit, wherein the antennas are laterally mounted on the delivery gates and directed to each other, so that they radiate to the gate area to be scanned. If, for example, four antennas are arranged per gate (two on either side) then with two delivery gates next to each other, two respective antennas of the adjacent delivery gates are also directed to each other. This can be identified clearly in FIG. 1, where the antennas A1 and A3 of the first delivery gate G1 and the antennas B2 and B4 of the second delivery gate G2 are turned towards each other. Assuming that the reading unit R2 of the delivery gate G2 is active just on the channel 0, as it is transmitting electromagnetic radio signals EB2 or EB4 over the antenna B2 or B4, then if the reading unit R1 were in the listen mode, it would receive these radio signals EB2, EB4 over the antennas A1 or A3, where the power of the received signals EB2 or EB4 would exceed −96 dBm.

Therefore, in compliance with the specifications of the EN 302 208 regulation, the reading unit R1 would have to regard the channel 0 as occupied and could not itself become active on this channel 0. There is a risk that the reading unit R1 additionally regards one or several other channels as occupied, in which the said sidebands lie, for example, the channels 1 and 2 as the reading unit R2, when transmitting, also unavoidably generates electromagnetic signal portions in sidebands outside its own frequency band, because no ideal filtering is possible. Therefore, the reading unit R1 would have to switch over to another channel, for example, the channel 3. As a result of the described problems, the number of usable channels for each further reading unit decreases by at least one channel. But, if delivery gates are now directly next to each other, as is the case in warehouses, in the worst case always only one reading unit can be active, if it intentionally occupies a channel with the main part of the transmitted signals and unintentionally occupies the remaining available channels with the signal portions transmitted in sidebands. Thus, the meaningful operation of such a warehouse with RFID is not possible any more, as only one respective truck could be unloaded while being RFID monitored.

OBJECT OF THE INVENTION

It is an object of the invention to provide an RFID system of the type indicated in the first paragraph, a gate arrangement of the type indicated in the second paragraph and a method of detecting transponders of the type indicated in the third paragraph with which the aforesaid disadvantages are avoided.

In order to achieve aforesaid object, with an RFID system in accordance with the invention, characteristics in accordance with the invention are provided, so that an RFID system in accordance with the invention can be characterized in the way indicated in the following, namely:

An RFID system for communicating between reading units and transponders in at least two different scan areas, wherein at least one reading unit and at least one antenna communicating with the reading unit are allocated to each scan area for the transmitting of electromagnetic signals to the scan area, wherein the antennas are so designed that at least one antenna of one scan area has a different polarization and/or a different polarization rotation direction relative to at least one antenna of another scan area.

In order to achieve aforesaid object with a gate arrangement in accordance with the invention, with at least two gates, wherein each gate has a scan area through which goods etcetera provided with transponders can be moved, an RFID system in accordance with the invention, is provided.

In order to achieve aforesaid object with a method in accordance with the invention for the detection of transponders, characteristics in accordance with the invention are provided so that a method in accordance with the invention can be characterized in the way indicated in the following, namely:

A method of detecting transponders in at least two different scan areas, wherein at least one reading unit communicating with the transponders and at least one antenna communicating with the reading unit for the radiation of electromagnetic signals to the scan area are allocated to each scan area, wherein electromagnetic signals radiated to a scan area have a different polarization and/or a different polarization rotation direction relative to electromagnetic signals radiated to another scan area.

The characteristics in accordance with the invention achieve that the reading units of the various scan areas do not block each other's frequency channels. This applies particularly to RFID applications in what are called dense reader environments, like for example, dock-door applications in warehouses, where the different scan areas are arranged very close together. Furthermore, it is possible to carry out what are called "Long range" RFID applications with the characteristics in accordance with the invention, with which applications the scan areas to be monitored by the reading units may be several meters in diameter. With the invention it is possible in particular to comply with the strict regulations of the EN 302 208 standard without frequency channels for the use being blocked by other reading units due to cross-talk in other scan areas and/or transmission of signal portions of the electromagnetic signals in sidebands. However, it is to be observed that the invention is not limited to the use within the UHF frequency range from 865 MHz to 868 MHz specified by the EN 302 208 standard, but is also applicable in other frequency ranges, for example, the UHF frequency range between 902 MHz and 928 MHz, usable in the USA and Australia for ISM applications or for applications in the microwave range around 2.4 GHz. A further advantage of the invention is the fact that the reading units can be constructed more cost-effectively, as their filtering of the out of band emissions need no longer be as strong as hitherto. The applications of the invention are manifold. In particular, it is suitable for the control of a flow of goods, like with the delivery of goods to warehouses, department stores and industrial firms, for example, for the identification of pallets, containers and other goods carrying transponders, or for the identification of animals.

In accordance with the measures of claim 2 or 8 the advantage is obtained that in dense reader environments mutual blocking of the reading units of adjacent scan areas can be prevented reliably. Owing to the minimum distance to each other, adjacent scan areas are the most problematic with respect to mutual disturbance by undesired transmission of electromagnetic signals or signal portions respectively to the respective adjacent scan areas. With the invention such dense reader environments can henceforth be maintained without the fact that the transmitting power of the reading units would have to be kept at a low level or that very costly and very expensive measures for filtering out of band emissions at the reading units would have to be taken.

The antennas used with dense reader environments generally have a directivity for the radiated electromagnetic signals. Then, the antennas are directed in such a way that the main radiation of the electromagnetic signals is directed to the scan area that is to be monitored, while such an arrangement and number of antennas per scan area are provided that the entire scan area is covered by electromagnetic signals. With dock-door applications, for example, there are a multiplicity of gates next to each other and the antennas are typically laterally directed to the scan area of the respective gate. However, this inevitably leads to the fact that the electromagnetic signals radiated by the antennas on one side of a gate radiate directly to the antennas mounted on the opposite side of the adjacent gate (and further gates). In accordance with the measures of the claim 3 or 9 the advantage is obtained that also with such an arrangement a mutual influence of the reading units of different scan areas, which could lead to channel blocking, is avoided. Moreover, the mutual disturbance can be prevented by the use of only two different polarization rotation directions of the electromagnetic signals.

In accordance with the measures of claim 4 or 10 the advantage is obtained that with a corresponding selection of combinations of polarizations and polarization rotation directions a mutual disturbance of the reading units of different scan areas is prevented. If either only antennas with elliptical polarization are used or antennas with circular polarization as well as antennas with elliptical polarization are used, then with the elliptical polarization the axial ratio between main axis and secondary axis of the ellipse should be high. Additionally, for the better suppression of mutual disturbance the rotation direction can also be selected differently. In accordance with the measures of claim 5 the advantage is obtained that such an antenna has good directivity and high radiation efficiency, the desired polarization of the radiated electromagnetic signals is easily adjustable and the antenna can be produced in a cost-effective way. Furthermore, such an antenna can be implemented in a water-resistant way, is easily adaptable to the different installation conditions, is small, robust and inconspicuous.

These and other aspects of the invention are apparent from and will be elucidated with reference to the embodiments described hereinafter.

BRIEF DESCRIPTION OF THE INVENTION

The invention will be described below on the basis of an example of embodiment represented in the sole Figure below though the invention should not be considered to be limited to this.

FIG. 1 shows a schematic block diagram of a gate arrangement in accordance with the invention, with an RFID system in accordance with the invention.

DESCRIPTION OF EMBODIMENT

With reference to FIG. 1 now an example of embodiment of a gate arrangement with an RFID system in accordance with the invention is described. The gate arrangement comprises two gates G1, G2, wherein the passage area of each gate G1, G2 is designed as scan area S1, S2, through which goods etcetera provided with transponders T1, T2 can be moved. It is pointed out that the number of gates of the gate arrangement, the number of antennas per gate and the number of transponders in the gate are not further limited and only two gates G1, G2 with four antennas and one transponder each are represented merely for clarity in the present example of embodiment. An RFID a system is allocated to each scan area S1, S2. It comprises one reading unit R1 for the scan area S1, which reading unit R1 is connected to four antennas A1, A2, A3, and A4. The antennas A1 and A3 are arranged to the left-hand side of the gate Gland directed to the right in the scan area S1. The antennas A2 and A4 are arranged to the right-hand side of the gate Gland directed to the left in the scan area S1. Similarly, one reading unit R2, which is connected to four antennas B1, B2, B3, and B4, is allocated to the scan area S2 of the gate G2. The antennas B1 and B3 are arranged on the left-hand side of the gate G2 and directed to the right in the scan area S2. The antennas B2 and B4 are arranged on the right-hand side of the gate G2 and directed to the left in the scan area S2. The reading unit R1 radiates in multiplexed fashion electromagnetic signals over the antennas A1 to A4 to the scan area S1, namely electromagnetic signals EA1 over the antenna A1, electromagnetic signals EA2 over the antenna A2, electromagnetic signals EA3 over the antenna A3 and electromagnetic signals EA4 over the antenna A4. The reading unit R2 radiates electromagnetic signals over the antennas B1 to B4 to the scan area S2, namely electromagnetic signals EB1 over the antenna B1, electromagnetic signals EB2 over the antenna B2, electromagnetic signals EB3 over the antenna B3 and electromagnetic signals EB4 over the antenna B4. The electromagnetic signals EA1-EA4, EB1-EB4 are preferably a modulated carrier signal in a selected frequency band, for example, a 200 kHz frequency band within the UHF frequency area of 865 MHz. A channel number is allocated to each frequency band of 200 kHz, for example, channel 0 to channel 10. If a transponder T1, T2 is located in the respective scan area S1, S2, in which the electromagnetic signals EA1-EA4, EB1-EB4 are radiated, the transponder T1, T2 responds by modulation of the received signal. This is detected by suitable, known evaluation methods in the reading unit R1, R2, while transmitted data can be reconstructed by means of demodulation of the signals modulated by the transponder T1, T2 and thus the respective transponder T1, T2 can be identified and if necessary additional communication and data exchange between the reading units R1, R2 and the transponders T1, T2 can take place.

As is shown in FIG. 1, the electromagnetic signals EA1 and EA3 radiated over the antennas A1 and A3 to the scan area S1 will be radiated—weakened, it is true, but nevertheless—also to the gate G2 scan area S2 located next to the area S1 and particularly here radiated to the antennas B2, B4, which are facing the antennas A1, A3. Conversely, also electromagnetic signals EB2, EB4 radiated over the antennas B2, B4 are received by the antennas A1, A3 of the adjacent gate G1. If now the reading unit R2 of the gate G2 is active on the channel 0, by sending electromagnetic radio signals EB2 or EB4 over the antenna B2 or B4, then the reading unit R1, which would itself like to become active on the very channel 0 and therefore first goes into a listen mode in which it "listens" or checks respectively whether it receives signals on this channel 0, which signals exceed a permissible minimum strength, will regard the channel 0 as occupied, because the radio signals EB2, EB4 directed exactly to the antennas A1, A3 are received by the antennas A1, A3 with a power above the determined minimum strength.

Here the present invention specifies, that by suitable selection of the polarization and/or the polarization rotation direction of the antennas A1-A4, B1-B4 it is prevented that the reading units R1, R2 of the gates G1, G2 located adjacent to each other mutually block the channels. Then, the antennas are designed in such a way that at least one antenna of a scan area has a different polarization and/or polarization rotation direction, with respect to at least one antenna of another scan area. In the present example of embodiment, purposefully such an arrangement is selected that the antennas A1, A3 of the gate G1 have a different polarization and/or polarization rotation direction with respect to the antennas B2, B4 of this gate G2. However, it would also be sufficient if only one of the antennas A1 or A3 had another polarization and/or polarization rotation direction than the antenna B2 or B4. In this case the operation of the reading unit R1 in the listen mode would be such that if, for example, a strange signal is received by the antenna A1 on a specific channel, this channel is not immediately marked as occupied, but first the other antenna A3 is switched to the receive mode, in order to determine whether on this antenna A3, which does have another polarization, the strength of the received strange signal is below the defined permissible maximum strength and, therefore, the channel can be used together with the antenna A3.

The mutual influence of the antennas A2, A4 of the gate G1 and the antennas B1, B3 of the gate G2 is less critical in the present example of embodiment, as these antennas are turned away from each other and therefore the strength of cross-talk signals will accordingly be small. Therefore, the electromagnetic signals EA2, EA4, EB1, EB3 radiated over the antennas A2, A4, B1, B3 can have the same polarization. However, it is to be taken into account that further gates may be arranged on the left and on the right of the gates G1, G2, in which further gates the said signals EA2, EA4, EB1, EB3 arrive, so that the polarization and/or polarization rotation direction of these signals with respect to the polarization and/or polarization rotation direction of antennas of the non-represented gates are to be considered. An advantageous arrangement of antennas of a plurality of gates next to each other would be the one with which all antennas A1, A3, B1, B3 radiating in a first direction, for example, to the right, have a first polarization rotation direction and all antennas A2, A4, B2, B4 radiating in an opposite, second, direction, that is to the left, have a second polarization rotation direction, different from the first polarization rotation direction.

Generally, it is necessary for electromagnetic waves that they are made up of an electrical and a magnetic field vector, which are always perpendicular to each other. In principle, the electromagnetic wave as a transverse wave attempts to spread in a direction that is oriented perpendicularly both to the electrical and to the magnetic field vector. The electromagnetic wave is characterized by frequency, wavelength, amplitude, phase and, additionally, by its polarization. If, the electrical and the magnetic field vector of an electromagnetic field has a constant direction at any point in space, the wave is regarded as linearly polarized, wherein the vector direction represents the polarization direction. In other words: with the linear polarization the electrical and the magnetic field vector of an electromagnetic field swing in a respective definitive plane in space. Generally, electromagnetic waves comprise a mixture of linearly polarized waves. With circularly polarized electromagnetic waves, the electrical and the magnetic field vector rotate once in the direction of propagation in each oscillation period. Depending on the rotation direction of the field vectors, there is mention of circular polarization rotating counterclockwise or clockwise. Then, the values of the field vectors remain constant. The circularly polarized electromagnetic wave is a special case of the elliptically polarized electromagnetic wave, with which the electrical and the magnetic field vector swing once in each oscillation period in the direction of propagation, wherein the rotation direction of the field vectors can be counterclockwise or clockwise. The values of the field vectors then change periodically without ever becoming zero. Furthermore, an essential characteristic with elliptical polarization is the ratio between main and secondary axis of the ellipse.

For the antennas A1, A3, B1, B3 rotating circularly in a first direction, for example, counterclockwise, polarized antennas are used in a preferred embodiment and for the antennas A2, A4, B2, B4 rotating circularly in opposite direction, for example clockwise, polarized antennas are used. This leads to the fact that the transfer of energy between the antennas A1, A3, B2, B4 turned to each other of the various gates G1, G2 is minimal (zero in the ideal case). Since the antennas of the transponders T1, T2 are usually linearly polarized, with circular polarization of the antennas of the reading units R1, R2, there will be a 3 dB polarization loss, it is true, which can, however, be canceled by an increased transmitting power of the reading units R1, R2 within the permissible limit values. Furthermore, the use of circularly polarized antennas offers advantages with the arrangement of the transponders T1, T2, as they can be positioned in arbitrary rotation position and in a real environment reflections, which can turn the polarization position, remain without any effect.

In a further variant of the invention the antennas A1, A3, B2, B4 of the various gates G1, G2 directed to each other are designed to be elliptically polarized, where in this arrangement the received power of the antennas A1, A3, B2, B4 in arbitrary positions is in fact non-zero; but since in reality only a weakening of the received power of signals of the other gate by 10 to 30 db is necessary, this can also be achieved in a satisfactory way with the elliptically polarized antennas. If, on the other hand, the elliptically polarized antennas are aligned with the same ellipse axis ratios at certain angles, the same effect as with circularly polarized antennas will be obtained.

The arrangements of antennas in accordance with the invention, with different polarizations or polarization rotation directions can be applied to any number of gates.

It should also be mentioned that instead of the terms "scan area", "scanning" and "scanned" also the terms "scanning field" or "communication area", "scan" or "communicate" and "scanned" or "communicated" are possible and are known and customary in the present field of technology.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An RFID system for communicating between reading units and transponders in at least two different scan areas, the system comprising:
   at least one reading unit for each scan area; and
   at least one directional antenna for each scan area, each directional antenna being configured to communicate with the reading unit for the radiation of electromagnetic signals to the scan area, the directional antennas of different scan areas having main radiating directions turned to each other being configured with opposing polarization rotation directions to mitigate the energy transfer between the directional antennas of the at least two different scan areas.

2. An RFID system as claimed in claim 1, wherein the opposing polarization rotation directions respectively of radiated electromagnetic signals are selected from circular polarization and elliptical polarization.

3. An RFID system as claimed in claim 1, wherein the antennas are designed as patch antennas.

4. A gate arrangement comprising at least two gates, wherein each gate has a scan area through which items provided with transponders can be moved, wherein the gate arrangement has an RFID system as claimed in claim 1.

5. An RFID system as claimed in claim 1, wherein
   each of the directional antennas, for different scan areas, having main radiating directions turned to each other is configured to transmit signals of a strength and radiation direction that are detectable at the other one of the directional antennas, and
   for each scan area, the at least one reading unit is configured to mitigate energy transfer between the directional antennas by blocking the processing of signals transmitted by the at least one directional antenna for a different scan area, based upon the polarization rotation direction of the signals.

6. An RFID system as claimed in claim 1, wherein the system includes,
   for a first one of the scan areas, first and second directional antennas configured and arranged to communicate with RFID tags on items passed therebetween, each one of the first and second directional antennas configured to radiate RFID signals that reach the other one of the first and second directional antennas and that have polarization rotation directions that are opposite one another,
   for a second one of the scan areas, third and fourth directional antennas configured and arranged to communicate with RFID tags on items passed therebetween, each one of the third and fourth directional antennas configured to radiate RFID signals that reach the other one of the third and fourth directional antennas and that have polarization rotation directions that are opposite one another,
   each one of the first and fourth antennas being respectively configured to radiate long-range RFID signals that are detectable at the other one of the first and fourth antennas, and
   the at least one directional antenna in the first and second scan areas respectively includes the first and fourth antennas.

7. An RFID system as claimed in claim 1, wherein
   the reading units include a first reading unit in a first one of the scan areas and a second reading unit in a second one of the scan areas,
   the at least one directional antenna includes a first directional antenna coupled to the first reading unit and a second directional antenna coupled to the second reading unit, the first and second antennas being respectively configured to transmit RFID signals that are detectable at the other one of the first and second antennas,
   the first reading unit is configured to transmit RFID signals of a first frequency and first polarity via the first antenna,
   the second reading unit is configured to transmit RFID signals of the first frequency and a second polarity via the second antenna, the first reading unit is configured to block RFID signals of the second polarity transmitted by the second reading unit via the second antenna, and the second reading unit is configured to block RFID signals of the first polarity transmitted by the first reading unit via the first antenna.

8. An RFD system as claimed in claim 1, wherein for each scan area the at least one reading unit is configured to operate in response to signals received at a first directional antenna for the first scan area and in response to detecting whether a signal on a channel having polarization direction is the same as the polarization direction used by the first directional antenna, detecting the channel as being occupied or unoccupied.

9. A method of detecting transponders in at least two different scan areas, wherein at least one reading unit communicating with the transponders and at least one directional antenna communicating with the reading unit are allocated to each scan area for the radiation of electromagnetic signals to the scan area, wherein electromagnetic signals radiated over directional antennas of different scan areas whose main radiating directions are turned to each other have opposing polarization directions to minimize the energy transfer between the directional antennas of the at least two different scan areas.

10. A method as claimed in claim 9, wherein the opposing polarization rotation directions respectively of radiated electromagnetic signals are selected from circular polarization and elliptical polarization.

11. An RFID system for communicating between reading units and transponders in at least two different scan areas, the system comprising:
at least one reading unit for each scan area; and
at least one directional antenna for each scan area, each directional antenna being configured to communicate with the reading unit for the radiation of electromagnetic signals to the scan area, the directional antennas of different scan areas having main radiating directions turned to each other being configured with opposing polarization rotation directions to mitigate the energy transfer between the directional antennas of the at least two different scan areas, wherein for each scan area the at least one reading unit is configured to
monitor channels associated with frequency bands received at a first directional antenna for the scan area,
in response to detecting a signal on a channel having polarization direction that is the same as the polarization direction used by the first directional antenna, detecting the channel as being occupied, and
in response to detecting a signal on a channel having polarization direction that is opposite the polarization direction used by the first directional antenna, detecting the channel as being unoccupied.

12. An RFID reader system comprising:
a first gate apparatus including a first reader and first and second directional antennas configured and arranged to communicate with RFID tags on items passed between the first and second directional antennas, by respectively transmitting RFID signals of opposite polarization rotation that reach the other one of the first and second directional antennas in a radiation direction that is detectable thereby; and
a second gate apparatus including a second reader and third and fourth directional antennas configured and arranged to communicate with RFID tags on items passed between the third and fourth directional antennas, by respectively transmitting RFID signals of opposite polarization rotation that reach the other one of the third and fourth directional antennas in a radiation direction that is detectable thereby, the second reader and fourth directional antenna being configured to transmit RFID signals that
reach the first directional antenna in a radiation direction that is detectable by the first directional antenna, and
have a polarization rotation that is opposite the polarization rotation of RFID signals transmitted by the first directional antenna, to mitigate reception, by the first directional antenna, of RFID signals transmitted from the fourth directional antenna.

13. The system of claim 12, wherein the respective readers are configured to
via the first and third directional antennas, transmit first and third RFID signals in a first common direction, the first and third signals having a clockwise polarization rotation, and
via the second and fourth directional antennas, transmit second and fourth RFID signals in a second common direction that is opposite the first common direction, the second and fourth RFID signals having a clockwise polarization rotation.

14. The system of claim 12, wherein
the second reader and fourth directional antenna are configured to transmit the RFID signals by transmitting first RFID signals of a first polarization rotation direction, and
the first reader and first directional antenna are configured to
receive RFID signals of a second polarization rotation direction that is opposite the first polarization rotation direction, and
mitigate the reception of RFID signals having the first polarization rotation direction, thereby mitigating interference from said RFID signals transmitted by the fourth directional antenna.

15. The system of claim 12, wherein the first reader and first directional antenna are configured to transmit RFID signals that
reach the fourth directional antenna in a radiation direction that is detectable by the second reader via the fourth directional antenna, and
have a polarization rotation that is opposite the polarization rotation of RFID signals transmitted by the fourth directional antenna, to mitigate reception, via the fourth directional antenna, of RFID signals transmitted from the first directional antenna.

16. The system of claim 12, wherein
the second reader and fourth directional antenna are configured to transmit signals that are out of a predefined frequency band and that are detectable at the first directional antenna,
the first reader includes a band emission filter configured to partially filter signals that are out of the predefined band, and
at least one of the first reader and first directional antenna being configured to block said signals transmitted via the fourth directional antenna that are out of the predefined band, based upon the polarization rotation of said signals.

17. The system of claim 12, wherein the first reader is configured to
monitor channels associated with frequency bands received via the first directional antenna,
in response to detecting a signal on a channel having polarization direction that is the same as the polarization direction of communications via the first directional antenna, detecting the channel as being occupied, and in response to detecting a signal on a channel having polarization direction that is opposite the polarization direction of communications via the first directional antenna, detecting the channel as being unoccupied.

18. The system of claim 12, wherein the first and second readers are respectively configured to simultaneously transmit RFID signals of opposite polarization rotation via the first and fourth directional antennas over a common frequency band, the transmitted signals being detectable at the other one of the first and fourth directional antennas, the first reader is configured to block the RFID signals transmitted via the fourth directional antenna and received via the first directional antenna, and the second reader is configured to block the RFID signals transmitted via the first directional antenna and received via the fourth directional antenna.

* * * * *